United States Patent
Williams et al.

(10) Patent No.: US 12,099,445 B2
(45) Date of Patent: Sep. 24, 2024

(54) WRITING BEYOND A POINTER

(71) Applicant: Arm Limited, Cambridge (GB)

(72) Inventors: Michael John Williams, Cambridge (GB); John Michael Horley, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/320,407

(22) Filed: May 19, 2023

(65) Prior Publication Data

US 2023/0385196 A1 Nov. 30, 2023

(30) Foreign Application Priority Data

May 27, 2022 (GB) ...................................... 2207848

(51) Int. Cl.
*G06F 12/0815* (2016.01)
(52) U.S. Cl.
CPC ................................ *G06F 12/0815* (2013.01)
(58) Field of Classification Search
CPC .................................................. G06F 12/0815
See application file for complete search history.

(56) References Cited

U.S. PATENT DOCUMENTS

| | | |
|---|---|---|
| 8,504,773 B1 | 8/2013 | Glasco et al. |
| 11,029,957 B1 | 6/2021 | Sahita et al. |
| 2006/0236011 A1 | 10/2006 | Narad et al. |
| 2007/0038810 A1 | 2/2007 | Rosen et al. |
| 2011/0087808 A1* | 4/2011 | Durand ................... G06F 13/28 710/26 |
| 2012/0331234 A1* | 12/2012 | Hirao .................. G06F 12/0806 711/143 |
| 2014/0052930 A1 | 2/2014 | Gulati et al. |

* cited by examiner

*Primary Examiner* — Jane W Benner
(74) *Attorney, Agent, or Firm* — NIXON & VANDERHYE P.C.

(57) ABSTRACT

Data processing apparatuses and methods of data processing are disclosed wherein a processing element maintains a buffer in the memory in support of the data processing it performs. A write pointer indicates a current write location in the buffer. A cache holds copies of the data which are subject to the data processing operations and allocations into the cache from the memory and write-backs from the cache to the memory are performed in cache line units of data. When the processing element performs a data write to the buffer at a location determined by the write pointer, the processor updates the write pointer in an update direction corresponding to a progression direction of data writes in the buffer, and further locations in the progression direction in the buffer between the location indicated by the write pointer and a boundary location are signalled to be written with a predetermined value.

20 Claims, 10 Drawing Sheets

WRITING BEYOND A POINTER

CROSS-REFERENCE TO RELATED APPLICATIONS

This application claims priority pursuant to 35 U.S.C. 119(a) to British Application No. 2207848.9, filed May 27, 2022, which application is incorporated herein by reference in its entirety.

FIELD

The present techniques relate to data processing. In particular, they relate to the operation of a data processing apparatus which maintains and writes to a buffer in memory at a location indicated by a write pointer.

SUMMARY

A data processing apparatus which performs data processing operations on data may maintain a buffer in the memory into which it writes data values. In order to track where a next data value should be written in the buffer, the data processing apparatus can be provided with a register storing a write pointer which is indicative of a current write location in the buffer. Then as new data values are written to the buffer the write pointer is correspondingly updated.

At least some examples provide a data processing apparatus comprising:
 a processing element configured to perform data processing operations;
 a memory configured to store data which is subject to the data processing operations, wherein as part of the data processing operations the processing circuitry is configured to maintain a buffer in the memory;
 a register configured to hold a write pointer indicative of a current write location in the buffer; and
 a cache configured to cache copies of the data which are subject to the data processing operations by the processing circuitry, wherein the copies of the data are stored in cache lines, wherein the cache is configured to perform allocation into the cache from the memory and write-back from the cache to the memory in cache line units of data,
 and wherein the processing element is configured such that, when the processing element performs a data write to the buffer at a location determined by the write pointer, the processor updates the write pointer in an update direction corresponding to a progression direction of data writes in the buffer, and further locations in the progression direction in the buffer between the location indicated by the write pointer and a boundary location are signalled to be written with a predetermined value.

At least some examples provide a method of data processing comprising:
 performing data processing operations;
 storing data which is subject to the data processing operations in a memory,
 wherein the data processing operations comprise maintaining a buffer in the memory;
 holding in a register a write pointer indicative of a current write location in the buffer; and
 caching in a cache copies of the data which is subject to the data processing operations, wherein the copies of the data are stored in cache lines, and wherein allocation into the cache from the memory and write-back from the cache to the memory are performed in cache line units of data;
 and, when a data write to the buffer is performed at a location determined by the write pointer, updating the write pointer in an update direction corresponding to a progression direction of data writes in the buffer, and signalling further locations in the procession direction in the buffer between the location indicated by the write pointer and a boundary location to be written with a predetermined value.

BRIEF DESCRIPTION

The present techniques will be described further, by way of example only, with reference to embodiments thereof as illustrated in the accompanying drawings, to be read in conjunction with the following description, in which:

FIG. 1A schematically illustrates a data processing apparatus in accordance with some disclosed examples;

FIG. 1B illustrates the writing of sample data to a buffer in accordance with some disclosed examples;

FIG. 2 schematically illustrates a data processing apparatus comprising statistical profiling circuitry in accordance with some disclosed examples;

FIG. 3 schematically illustrates a data processing apparatus comprising trace generation circuitry in accordance with some disclosed examples;

Figure 6:
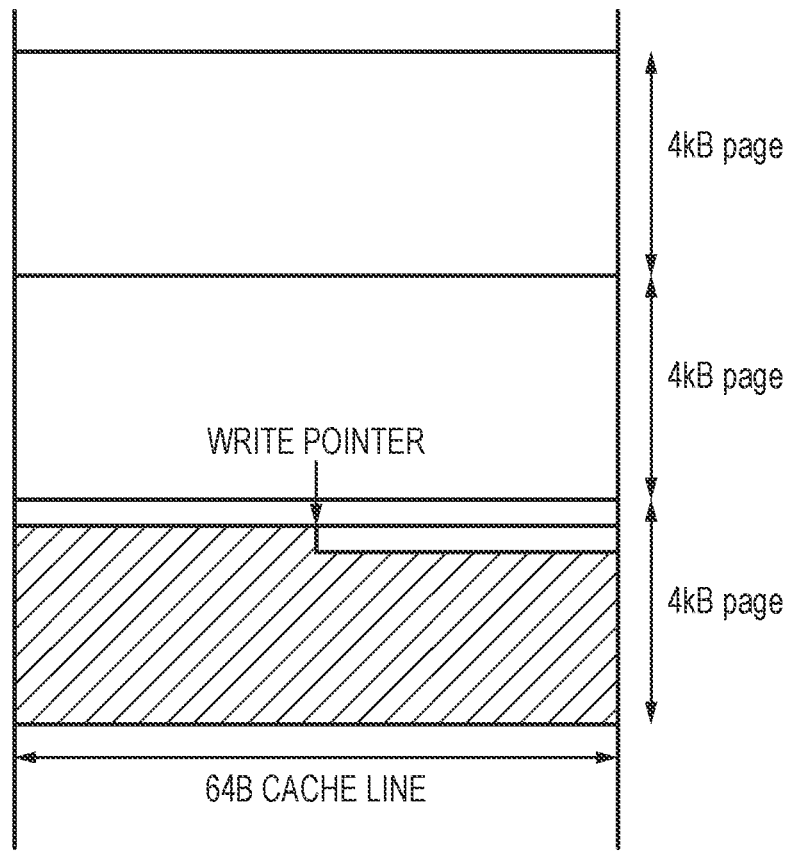
Figure 8:
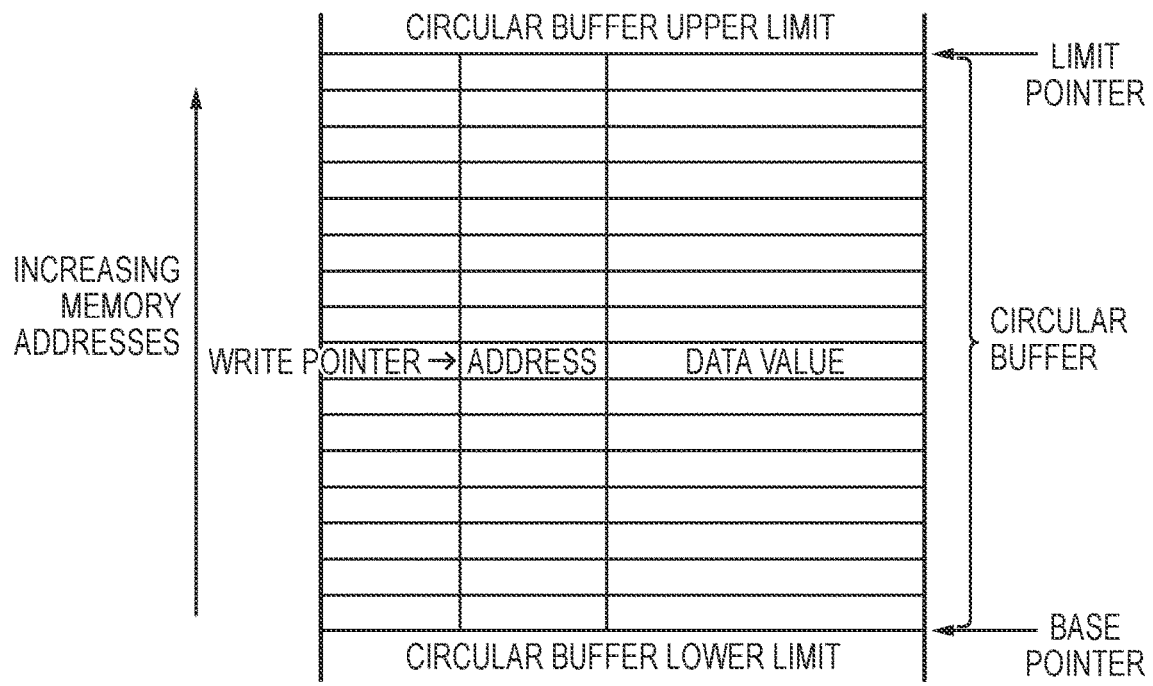
Figure 9:
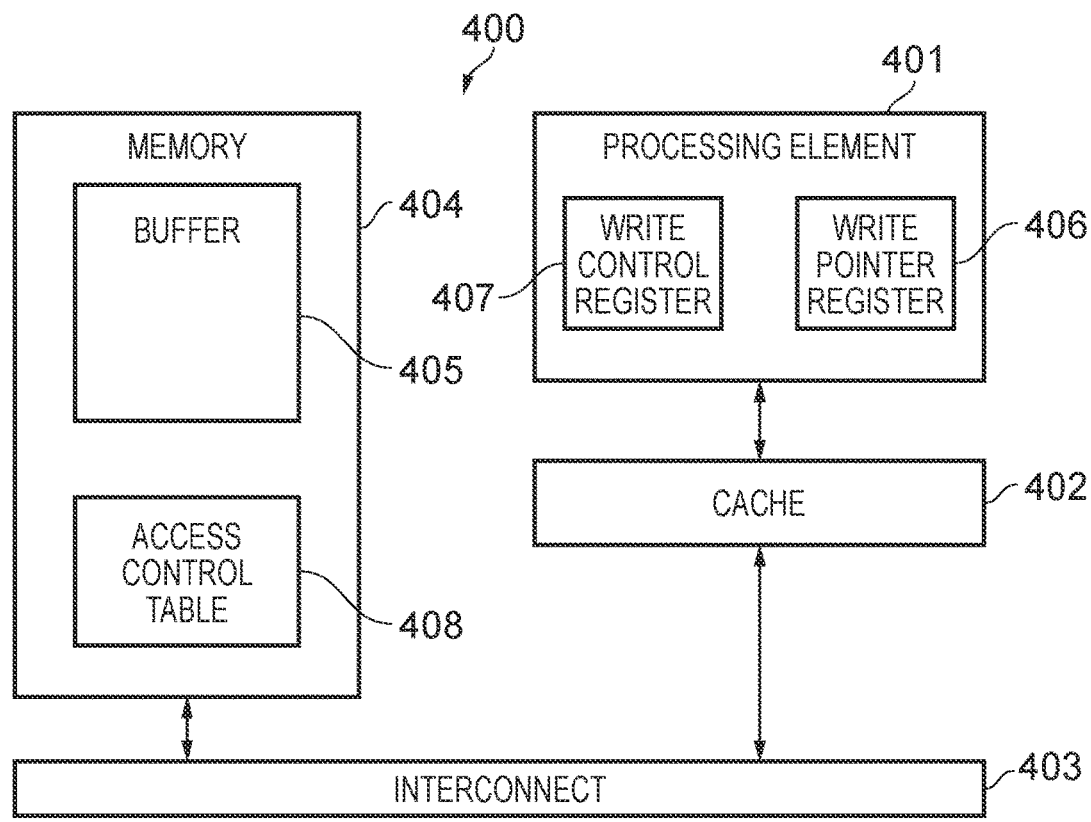
Figure 10:
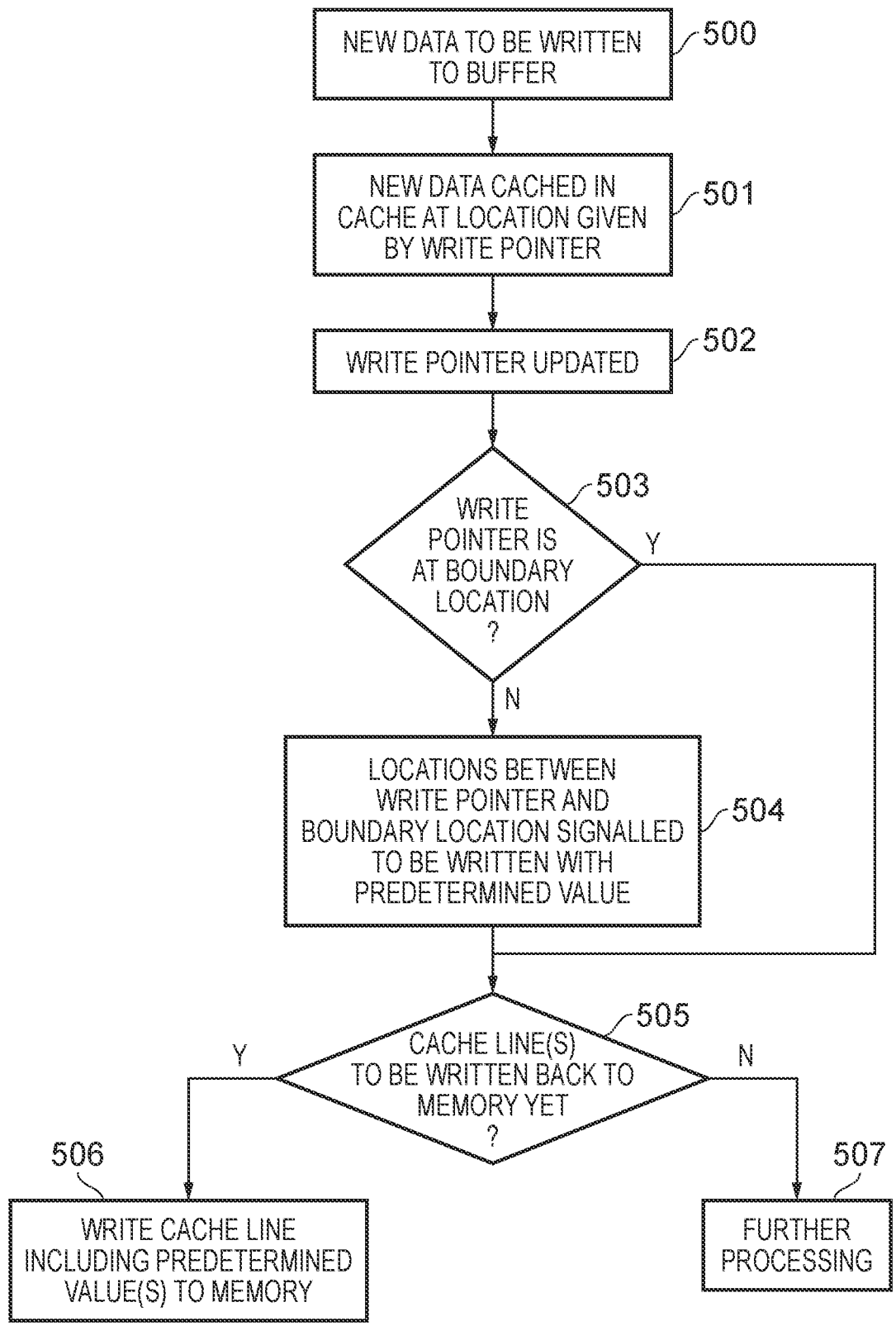

FIGS. 5A-D illustrate the present techniques when pushing a new data item into a buffer and when popping entries from a buffer in accordance with some disclosed examples;

FIG. 6 illustrates a region of memory sub-divided into memory pages which hold a buffer in accordance with the present techniques;

FIGS. 7A-D illustrate the present techniques when pushing a new data item into a buffer and when popping entries from a buffer in accordance with some disclosed examples;

FIG. 8 illustrates a region of memory in which a circular buffer is implemented in accordance with the present techniques;

FIG. 9 schematically illustrates a data processing apparatus in accordance with some disclosed examples; and FIG. 10 is a flow diagram showing a sequence of steps which are taken in accordance with the method of some disclosed examples.

DETAILED DESCRIPTION

In one example disclosed herein there is a data processing apparatus comprising:
 a processing element configured to perform data processing operations;
 a memory configured to store data which is subject to the data processing operations, wherein as part of the data processing operations the processing circuitry is configured to maintain a buffer in the memory;
 a register configured to hold a write pointer indicative of a current write location in the buffer; and
 a cache configured to cache copies of the data which are subject to the data processing operations by the processing circuitry, wherein the copies of the data are stored in cache lines, wherein the cache is configured to perform allocation into the cache from the memory and write-back from the cache to the memory in cache line units of data, and wherein the processing element is configured such that, when the processing element performs a data write to the buffer at a location determined by the write pointer, the processor updates the write pointer in an update direction corresponding to a progression direction of data writes in the buffer, and further locations in the progression direction in the buffer between the location indicated by the write pointer and a boundary location are signalled to be written with a predetermined value.

The use of a cache to hold temporary copies of the data which are subject to the data processing operations by the processing circuitry improves the efficiency of the processing element by largely avoiding the latency associated with reading data from and writing data to the memory. Hence, in the case of a buffer which is established in the memory, a more efficient usage of that buffer generally results from caching the data items which the processing element is currently reading from and writing to the buffer. Moreover, when the cache is organised to perform allocation into the cache from the memory and write-back from the cache to the memory in cache line units of data, this improves the efficiency of the memory system interaction of the cache. This cache line based approach however also means that generally speaking an action with respect to buffer content in a given cache line will mean that the whole cache line will first need to be read by the processing element before it can modify any data item within that cache line. The present techniques are based on the realisation that when the buffer usage is directed with reference to a write pointer, and when there is a defined progression direction of data writes in the buffer, this means that locations beyond the write pointer, which would otherwise not be accessed until the write pointer reaches them, may be unnecessarily brought into the cache by the whole cache line based approach to data movement into and out of the cache. As such the present techniques propose an approach according to which when the processing element performs a data write to the buffer (as guided by the write pointer) that locations in the buffer between the location indicated by the write pointer and a boundary location (in a write progression direction for the usage of the buffer) are signalled to be written with a predetermined value. This 'signalling to be written with the predetermined value' may on the one hand involve the corresponding cache locations being explicitly populated with the predetermined value. In due course the cache line, including the predetermined value(s), may then later be written back to memory (if not otherwise further modified in the interim). On the other hand, the 'signalling to be written with the predetermined value' may involve the corresponding cache locations being indicated to be (temporarily) associated with the predetermined value. In other words, the corresponding cache locations are not (yet) explicitly modified. As will be discussed in more detail below, this technique may support usages of the buffer such as pushing and popping of a data item in relatively quick succession, by formally correctly noting the amendment of these locations (covering the eventuality that they do indeed then have to be correspondingly modified in the cache line and/or in memory), but at the same time saving power/processing expenditure by not actually amending those locations in the knowledge that the modification may be reversed (or at least abandoned) before it needs to be fully implemented.

As mentioned above, the 'signalling to be written with the predetermined value' may be variously implemented, but in some examples the data processing apparatus further comprises a storage element associated with the cache and configured to store indicator values associated with each cache line of the cache, wherein respective bits of an indicator value indicate which data items of a cache line are signalled to have the predetermined value. Accordingly, this provides an efficient mechanism for the signalling, in which setting a bit of the indicator value shows that a corresponding data item of the cache line should have the predetermined value.

Hence in some examples, signalling that the further locations in the progression direction in the buffer between the location indicated by the write pointer and the boundary location are to be written with the predetermined value comprises setting bits of at least one indicator value associated with at least one cache line associated with the further locations.

The buffer in memory may take a variety of forms, but in some examples the processing circuitry is configured to maintain the buffer in the memory in a last-in-first-out manner, wherein a pushed data item entry added to the buffer is written at the location determined by the write pointer, wherein removal of a popped data item from the buffer comprises popping the popped data item from a pop location adjacent to the location determined by the write pointer in an opposite direction to the progression direction, and wherein the pop location is signalled to be written with the predetermined value.

When there is provided a storage element associated with the cache and configured to store indicator values associated with each cache line of the cache, in some examples the removal of the popped data item from the buffer comprises un-setting the bits of the at least one indicator value associated with the at least one cache line associated with the further locations and un-setting a bit of an indicator value associated with the pop location.

The boundary location may take a variety of forms. In some examples the boundary location corresponds to a cache line extremity. In some examples the cache line extremity corresponds to a cache line end. In some examples the boundary location corresponds to a cache line start.

The use of the write pointer and the manner in which it is updated may be variously configured, for example in dependence on the type of buffer which is in use, and possibly in dependence on established convention for the order in which memory locations are used for that type of buffer. In some examples the processing element is configured to update the write pointer in an ascending direction corresponding to an ascending progression direction of data writes in the buffer. In some examples the processing element is configured to update the write pointer in a descending direction corresponding to a descending progression direction of data writes in the buffer.

The buffer may be used in a variety of contexts. In some examples the data processing operations performed by the processing element comprise data sampling and wherein the buffer in the memory is a sample data buffer. In some examples the data processing operations performed by the processing element comprise generation of program-flow trace data and wherein the buffer in the memory is a trace buffer. In some examples the data processing operations performed by the processing element comprise execution of branch instructions and return instructions, and wherein the buffer in the memory is a hardware shadow stack. In some examples the buffer in the memory is a software stack, wherein the data processing operations performed by the processing element comprise pushing data onto the software stack and popping data from the software stack.

It should further be noted that in examples in which the boundary location is the extremity of a cache line, this extremity may or may not correspond to the extremity of the cache line in which the data value at the location is stored temporarily in the cache. In other words, the writing of the predetermined value to further locations beyond the write pointer might only extend to an end of the cache line into which the write pointer indicates. However, the writing of the predetermined value may also extend further than that up to another defined boundary.

Thus in some examples the boundary location is the extremity of the cache line in which the data value at the location is stored temporarily in the cache.

In some examples the boundary location is the extremity of a further cache line which is not the cache line in which the data value at the location is stored temporarily in the cache, and wherein a contiguous block of data between the location determined by the write pointer at which the processing element performs the data write to the buffer and the extremity of the further cache line is caused to be written with the predetermined value. In some examples the boundary location corresponds to a memory page boundary.

The buffer may be administered in a variety of ways with regard to its extent, for example by a limit pointer defining the end of the buffer. In other examples the buffer may be circularly defined, wherein the processing circuitry is configured to maintain the buffer in a wrap-around manner, wherein the buffer is arranged to cover a predetermined range of memory locations and when a write has reached an extremity of the predetermined range of memory locations in the progression direction of data writes in the buffer the processing circuitry performs a next data write to the buffer at an opposite extremity of the predetermined range of memory locations, and wherein the contiguous block of data has a predetermined maximum size.

It may be implemented that the present techniques are additionally selectively enabled. In some examples the data processing apparatus further comprises at least one control register configured to hold a control value, wherein the processing element is configured such that signalling the predetermined value to be written to the further locations in the procession direction in the buffer between the location indicated by the write pointer and the boundary location is further dependent on the control value.

Such selective control may also be implemented in others ways and in some examples access to data stored in the memory is dependent on configuration data stored in at least one access control table stored in the memory, wherein the configuration data defines for each location in the memory characteristics of the access, and wherein the processing element is configured such that signalling the predetermined value to be written to the further locations in the progression direction in the buffer between the location indicated by the write pointer and the boundary location is further dependent on the configuration data corresponding to the location indicated by the write pointer.

It should further be noted that the predetermined value may be variously implemented. In some examples the predetermined value is a representation of zero. In some examples another valid data representation is used, and indeed any value could be chosen within the full range of data values which can be represented in the system. In some examples the predetermined value which is signalled to be written between the location indicated by the write pointer and the boundary location has a null meaning with respect to the data processing operations performed. In other words, the predetermined value is not a data value within the range of data values which can be represented in the system, but rather is a value with an explicit "null" meaning in the system.

The present techniques may be implemented in a single processing element system or may be implemented in a multi-processor element system. Hence in some examples the memory is at least partly shared with a further processing element having a further cache, and the cache and the further cache cooperatively participate in a cache coherence protocol with respect to content of the cache and the further cache. The sharing of the memory with the further processing element means that, in general, data values which can be cached in the cache (and the further cache) may be accessed in memory by more the more than one processing element. Accordingly, the cache and the further cache need to be organised with certain inter-cache communication, such that conflicting modifications to shared data items by different processing elements cannot arise. The present techniques may find particular applicability in such a context, since the approach of writing beyond the write pointer to, for example, populate a full cache-line, means that shared ownership issues with respect to that cache-line do not arise. As a result, delays associated with communicating requests to relinquish ownership of a certain cache line are avoided.

In one example disclosed herein there is a method of data processing comprising:

performing data processing operations;

storing data which is subject to the data processing operations in a memory, wherein the data processing operations comprise maintaining a buffer in the memory;

holding in a register a write pointer indicative of a current write location in the buffer; and caching in a cache copies of the data which is subject to the data processing operations, wherein the copies of the data are stored in cache lines, and wherein allocation into the cache from the memory and write-back from the cache to the memory are performed in cache line units of data;

and, when a data write to the buffer is performed at a location determined by the write pointer, updating the write pointer in an update direction corresponding to a progression direction of data writes in the buffer, and signalling further locations in the procession direction in the buffer between the location indicated by the write pointer and a boundary location to be written with a predetermined value.

Some particular embodiments are now described with reference to the figures.

Figure 1A:
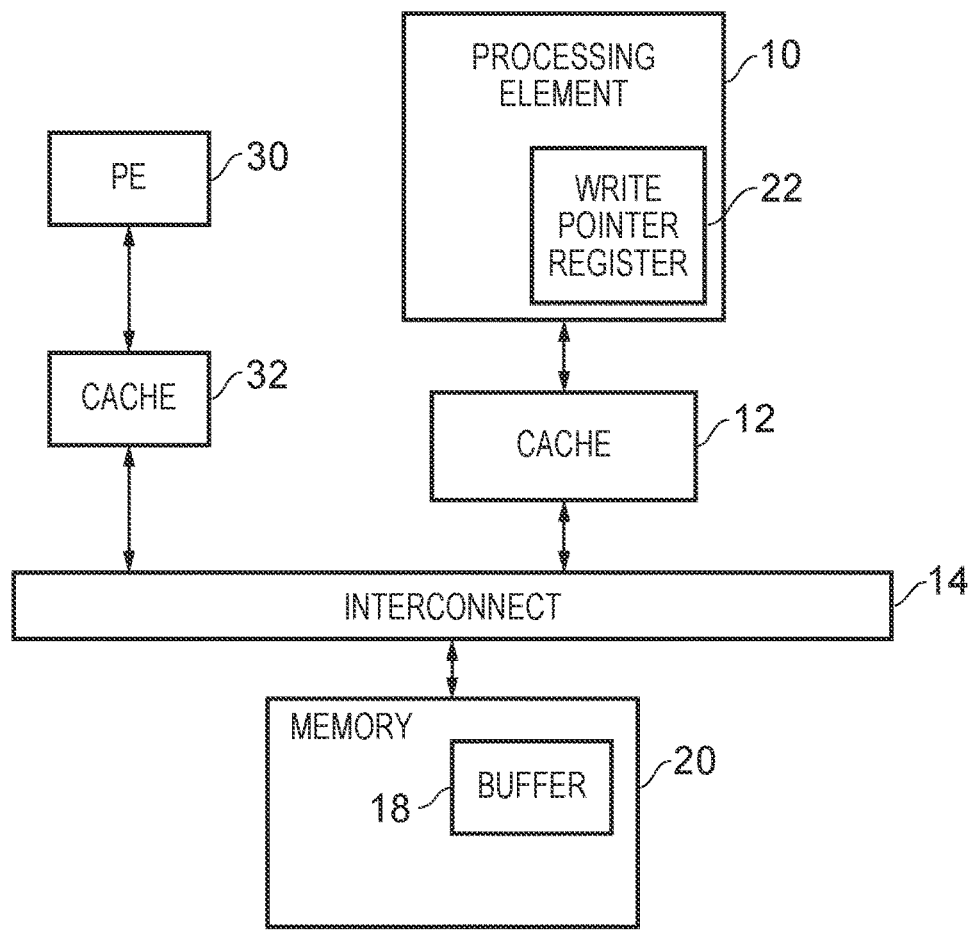

FIG. 1A schematically illustrates a data processing apparatus in accordance with some disclosed examples. Processing element 10 is configured to perform data processing operations with respect to data values stored in the memory 20. Temporary copies of data values which are currently subject to the data processing operations are held in the cache 12 associated with the processing element 10. Access to the memory 20 is mediated by the interconnect 14. As part of the data processing operations which it performs, the processing element 10 maintains a buffer 18 in the memory 20. For the purposes of the present techniques the buffer 18 may serve a wide variety of purposes and various examples are described in more detail below with reference to the figures which follow. As part of its administration of the buffer 18 the processing element 10 comprises a write pointer register 22, which holds the current value of a write pointer which dictates where the next modification of content of the buffer 18 will take place. The interaction of the processing element 10, the cache 12, the buffer 18, and the write pointer held by the write pointer register 22 are described in more detail with reference to the figures which follow. The data processing apparatus in FIG. 1A is further shown to comprise a further processing element 30, which has its own associated cache 32. The cache 32 and the cache 12 are arranged to participate in a cache coherency protocol to avoid conflicting modifications to shared data (i.e. data values held in locations of memory 20 to which both processing element 10 and processing element 30 have access).

Figure 1B:
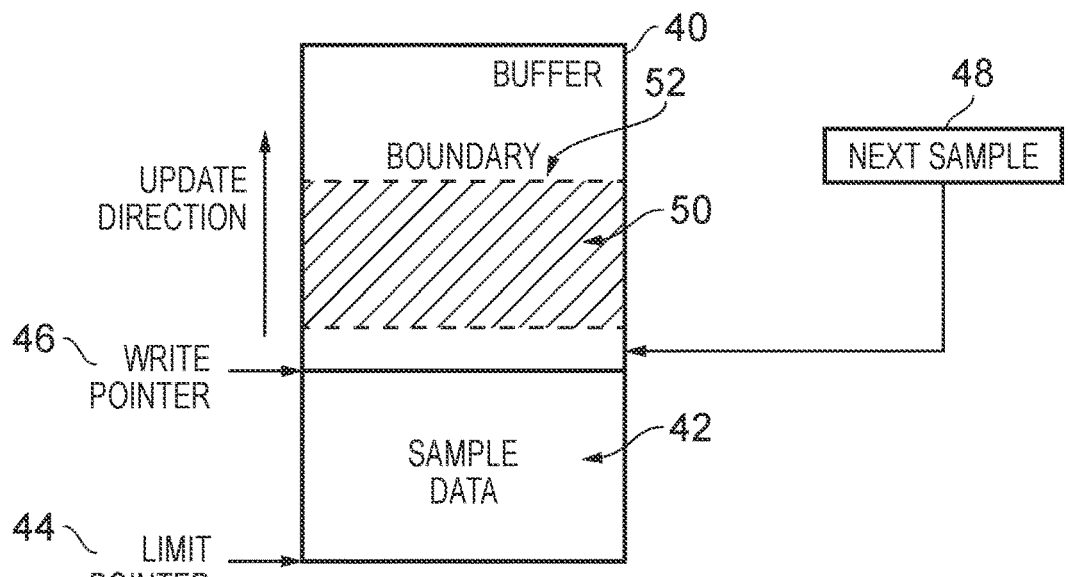

FIG. 1B illustrates the writing of sample data to a buffer in accordance with some disclosed examples. The illustrated buffer 40 is used for the accumulation of sample data, of which a portion 42 has already been stored in the buffer. Two pointers are maintained with respect to this buffer, namely a lower limit pointer 44, which indicates a lower extent of the buffer and a write pointer 46, which indicates where the next data (sample data item) is to be written. Accordingly, the next sample 48 which is written to the buffer 40 is written at a location indicated by the write pointer 46. However, in accordance with the present techniques an (arbitrarily sized) portion 50 of the buffer 40 extending in the update direction (i.e. the direction in which further samples could be expected to be written in the buffer) is additionally updated when the next sample 48 is written. The extent of this portion 50 is as far as the boundary 52. This boundary may be variously defined, in particular either with respect to a characteristic of a cache (such as cache 12 in FIG. 1A), which caches the sample data, such as a cache line boundary, or with respect to a characteristic of the manner in which data is organised in the memory holding the buffer 40, such as a memory page boundary.

Figure 2:
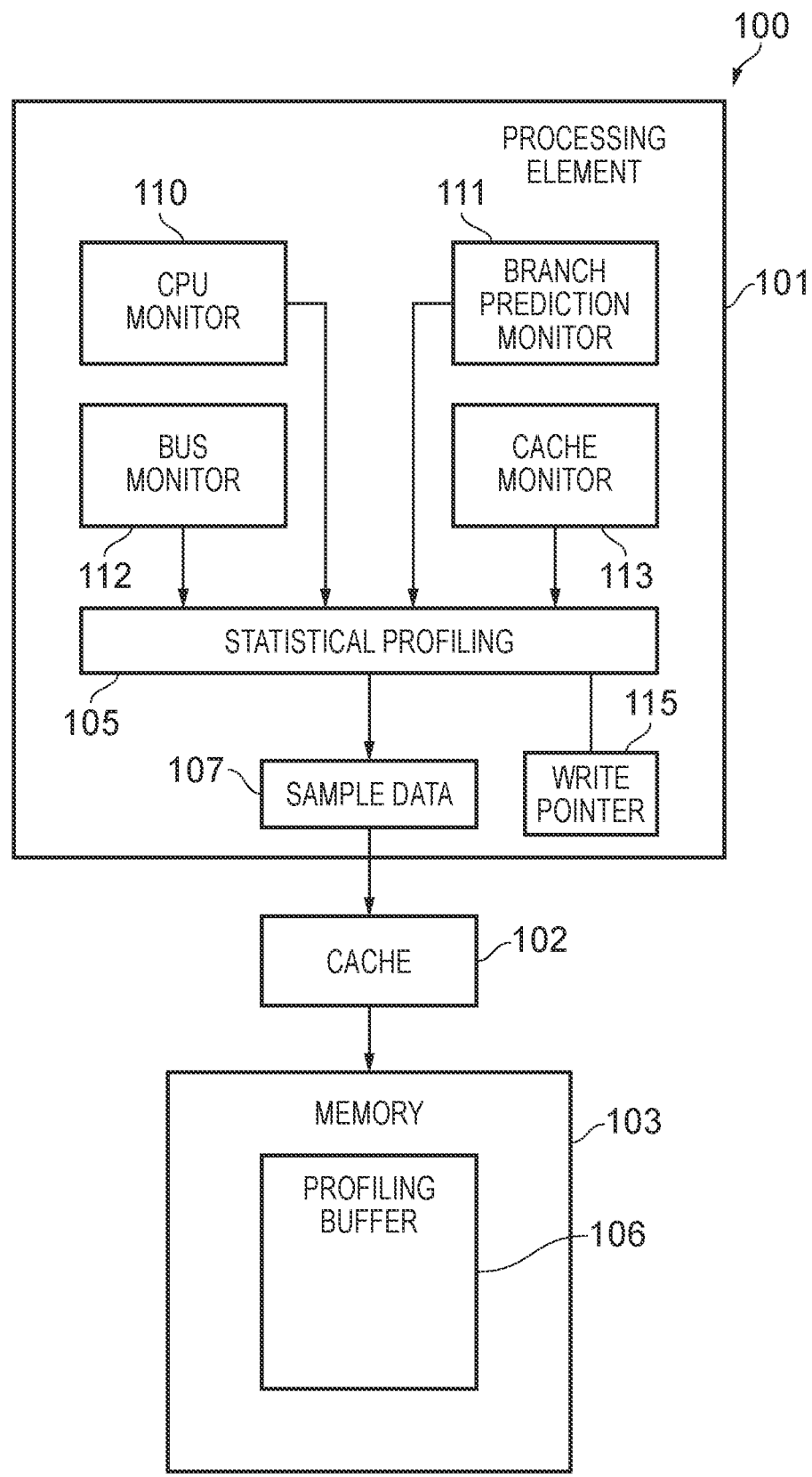

FIG. 2 schematically illustrates a data processing apparatus comprising statistical profiling circuitry in accordance with some disclosed examples. The apparatus 100 comprises a processing element 101, a cache 102, and a memory 103. The processing element 101 is shown in particular to comprise statistical profiling circuitry 105, which is arranged to monitor various aspects of the execution of data processing operations by the processing element 101 and to generate a stream of sample data that it writes to profiling buffer 106 in memory 103. The aspects monitored are not limited and can take a wide variety of forms, but for the purposes of exemplary illustration the figure shows a CPU monitor 110, a branch prediction monitor 111, a bus monitor 112, and a cache monitor 113. Each of these monitors gathers data indicative of the respective operation of the component it monitors according to a predetermined timescale and feeds these data to the statistical profiling circuitry 105. The statistical profiling circuitry 105 generates a stream of sample data, of which an example item 107 is shown in the figure. The statistical profiling circuitry 105 has a write pointer 115, which both locates where the next data is to be written and informs software where the data currently ends in the profiling buffer 106. In writing the sample data 107 to the profiling buffer 106, the sample data is cached in the cache 102. Hence the present techniques (as described in more detail elsewhere herein) are applied to the writing of the sample data 107 in regards to the cache line structure of the cache 102 and/or the administration of the memory in which the profiling buffer 106 is held.

Figure 3:
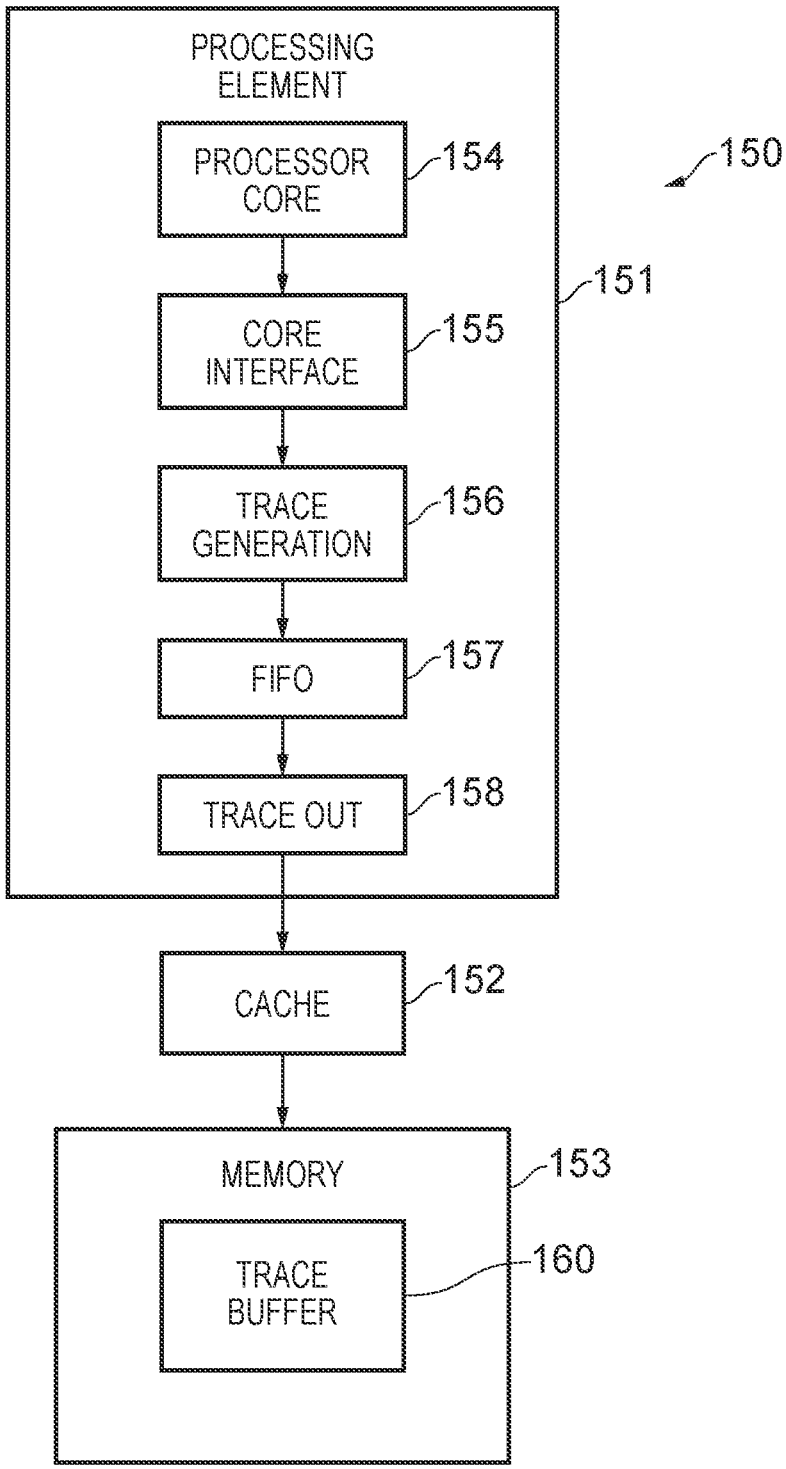

FIG. 3 schematically illustrates a data processing apparatus comprising trace generation circuitry in accordance with some disclosed examples. The apparatus 150 comprises a processing element 151, an associated cache 152, and a memory 153. The processing element 151 comprises a processor core 154, which performs various data processing operations by the execution of a defined sequence of program instructions. In order for the programmer to monitor and debug the execution of those program instructions by the processor core 154, the processing element is further provided with trace generation circuitry 156. The trace generation circuitry 156 receives indications of the operation of the processor core 154 by the core interface 155. On the basis of these indications the trace generation circuitry 156 generates a stream of program flow trace data, which is written out to trace buffer 160 defined in the memory 153. Writes to the trace buffer 160 are also cached in the cache 152. Trace generation circuitry 156 writes out the trace data via the FIFO (first-in-first-out) buffer 157 and the trace out interface 158. In this example the trace generation circuitry 156 employs the trace buffer 160 as a circular buffer, i.e. after writing the last entry in the defined buffer size the write pointer is wrapped to a base pointer and starts overwriting the existing content of the buffer.

Figure 4A:
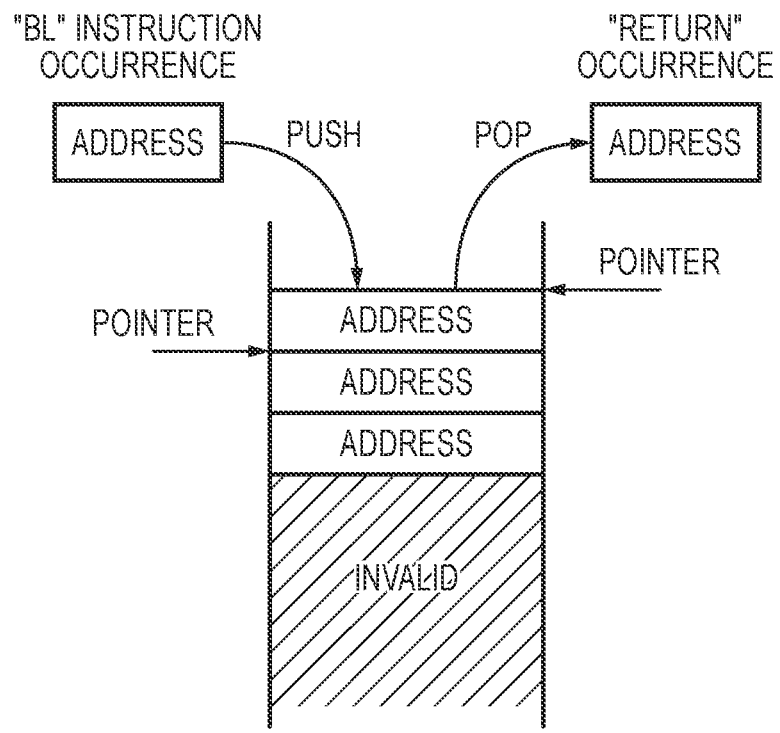
FIG. 4A illustrates the operation of a hardware shadow stack mechanism in accordance with some disclosed examples.
Figure 4B:
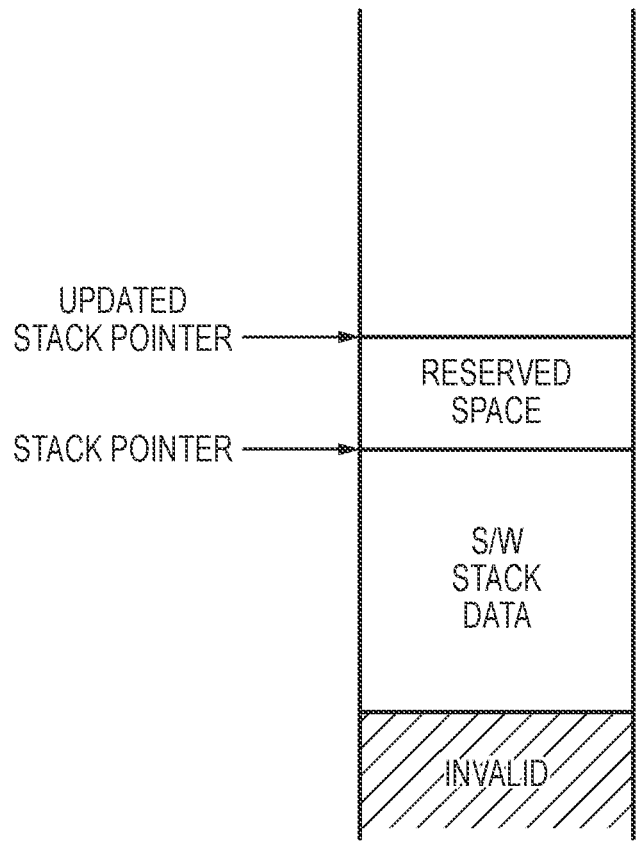
FIG. 4B illustrates a software stack in accordance with some disclosed examples.

Two further example contexts in which the present techniques may find application are shown in FIGS. 4A and 4B. FIG. 4A illustrates the operation of a hardware shadow stack mechanism in accordance with some disclosed examples. A stack of return addresses is maintained in memory in a last-in-first-out (LIFO) manner, whereby the execution of a BL (branch with link) instruction causes the address of the next instruction to be copied into the link register and causes a branch to a destination specified in the instruction. The program call stack is shadowed by the structure illustrated, whereby a BL instruction causes an address to be pushed onto this stack and a return instruction causes an address to be popped from the stack. The conventional configuration shown decrements the write pointer before the write and a pop increments the pointer after the read. This could of course be differently defined (e.g. in increment/decrement direction and action ordering). At least a portion of the stack of return addresses is also cached in the cache associated with the processing element.

FIG. 4B illustrates a software stack in accordance with some disclosed examples. This software stack forms an arbitrarily sized portion of memory, allocated to the software to use for its own purposes. The software stack is pointed to by a stack pointer (the value of which is stored in the stack pointer register accessible to the software). Software can push data onto the stack, pop data from the stack, and also reserve and free space on the stack by changing the stack pointer. This latter feature is schematically illustrated in FIG. 4B, whereby an update to the stack pointer has reserved a portion of memory ("reserved space") in addition to the existing software stack data. The conventional configuration of the example software stack shown decrements the stack pointer on a push (before the write) and a pop increments the pointer after the read. This could of course be differently defined (e.g. in increment/decrement direction and action ordering). At least a portion of the software stack is also cached in the cache associated with the processing element executing the software.

Figure 4C:
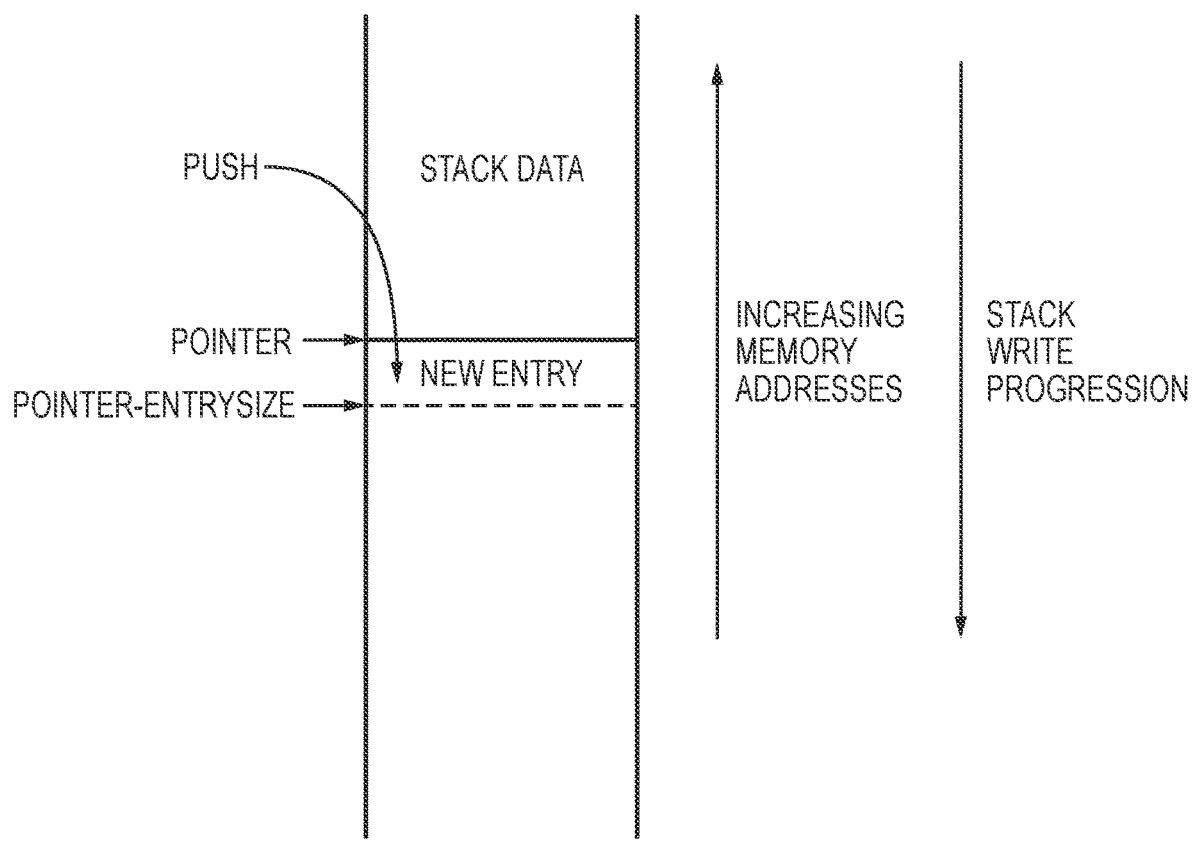
FIG. 4C illustrates a descending stack in accordance with some disclosed examples.

FIG. 4C illustrates a "descending" stack in accordance with some disclosed examples. According to this stack configuration, the stack grows in a "downward" direction (i.e. towards lower valued addresses), and the pointer always points to the lowest addressed byte of the last item stored.

Hence, a pushed data item (new entry) is added at the location defined by POINTER-ENTRYSIZE, and then the pointer is update to take the value POINTER-ENTRYSIZE (or, equivalently, the pointer is updated to POINTER-ENTRYSIZE and then the entry is written to that location). For example, the pointer starts pointing at 0x508. The last entry written was 8 bytes in size and written to 0x508 to 0x50F. When a new entry pushed, it is written to 0x500 (to 0x507), and the pointer then points to 0x500 after the push.

Figure 5A:
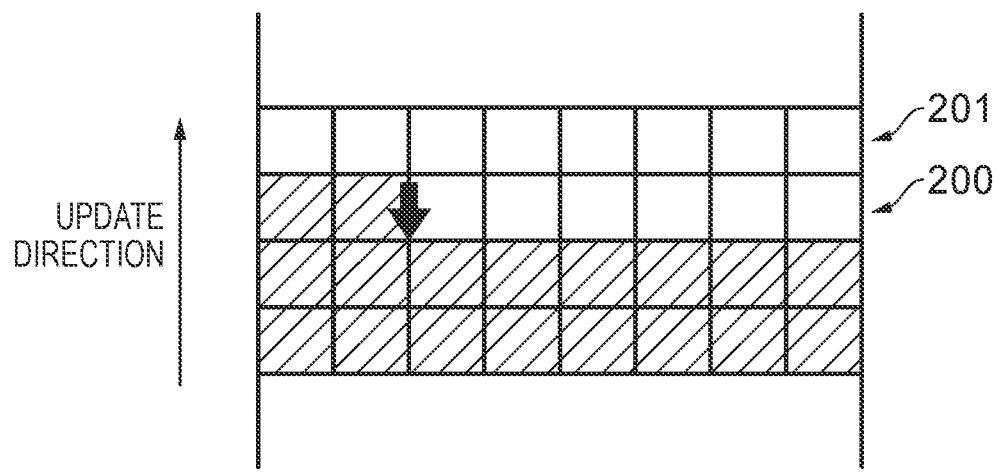
Figure 5B:
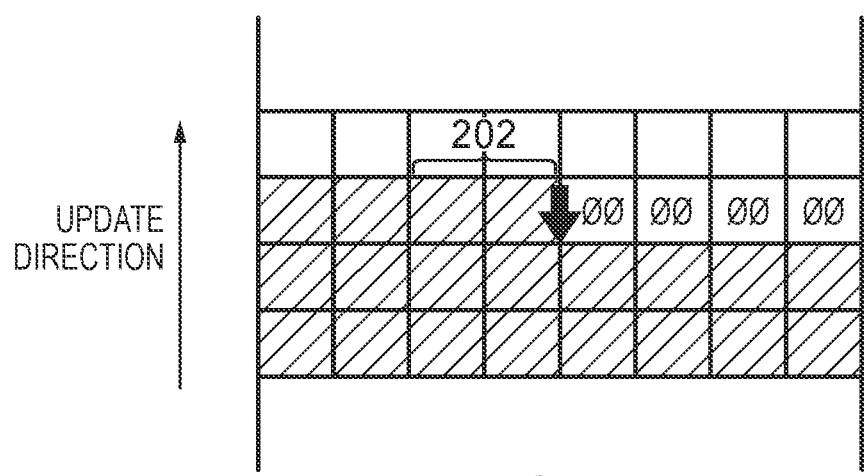

The present techniques are to be understood as applicable to any of the example contexts described above (and to others not explicitly illustrated), in which memory buffer data (of whatever form and for whatever purpose) is cached in a local cache of a processing element accessing that memory buffer data. FIGS. 5A-5D illustrate the present techniques when pushing a new data item into a buffer and when popping entries from a buffer in accordance with some disclosed examples. The figures each show a set of data storage locations, where for ease of explanation these may be viewed as each representing an 8 B block of memory, and where together each horizontal set of eight such blocks thus corresponds to 64 B of memory, this corresponding to a cache line size in this example. FIG. 5A shows an initial configuration, in which the hatched blocks are those which have previously been written to the memory buffer. The shaded arrow indicated the current position of the write pointer, such that a next data item written to the memory buffer will be written to the location immediately to the right of it, with sequential writes filling the cache line 200 before proceeding from the left of the sequentially next cache line 201. However according to the present techniques, and as shown in FIG. 5b, when the next write to cache line 200 occurs, which itself occupies two further 8 B blocks, the remainder of the blocks in this cache line 200 are written with a predetermined value (which is this case is shown to be "00", i.e. "all zeroes") for each 8 B block. As such it will be appreciated that the space between the write pointer (as updated) and the cache line end is defined as invalid, such that the processing element can also "take ownership" of the whole of the line and write the set of zeroes to this area. FIGS. 5A-5D show the "update direction" with respect to the memory buffer, i.e. the direction in which additional writes to the memory buffer will progress (as well as left-to-right across each cache line's worth of memory at a finer level of granularity).

Figure 5C:
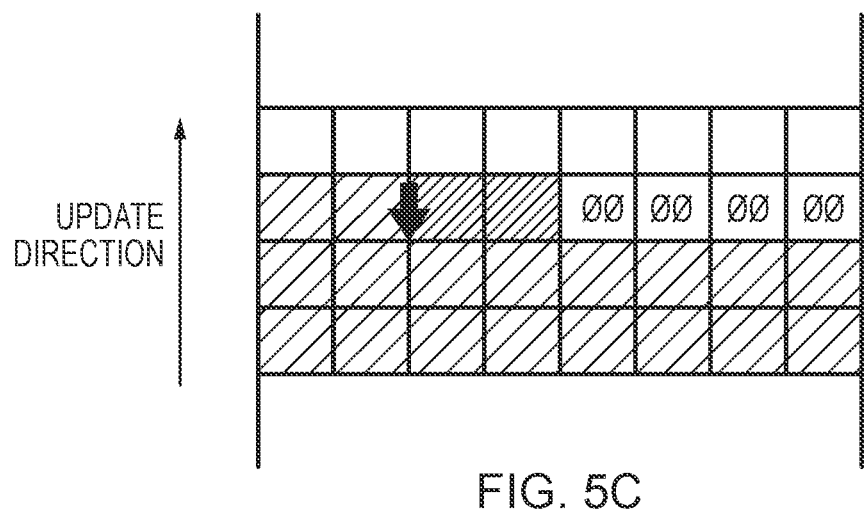
Figure 5D:
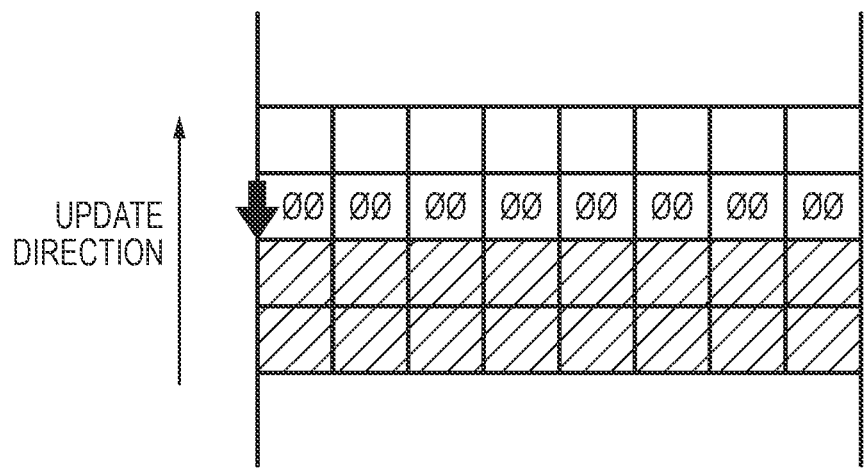

However, whilst the memory buffer could be used in a monotonically increasing fashion, FIGS. 5C and 5D show examples of the situation when data items are removed ("popped") from the memory buffer. In the example of FIG. 5C, when the two data items 202 written in the transition from FIG. 5A to 5B have been popped, this approach shows the write pointer simply being updated (i.e. the data items 202 in fact remain in the cache line. These data items 202 could later be written back to memory, although this depends on how the data are being used. Because these memory locations are now in the region above the write pointer (which is considered invalid), such a write-back may not be required, unless there is further consequence of these data items having been temporarily present which requires the write-back for consistency. In the example of FIG. 5D, two further data items have been popped from the memory buffer and the write pointer now aligns with the start of the corresponding cache line. Note that in this example, the popped locations have been explicitly written with the predetermined value (i.e. "00" in this case) such that the entire cache line is now populated by that predetermined value. In some implementations this fact can be used when writing back this cache line to memory, in order to more efficiently encode that write back, i.e. whereby the cache can simply report the cache line as "all zeroes" to the memory system, and not have to provide explicit data values for each 8 B block of the cache line.

FIG. 6 illustrates a region of memory sub-divided into memory pages which hold a buffer in accordance with the present techniques. The hatched area shows data which has already been written to the buffer, whereby it can be seen that within the current 4 kB page of memory the write pointer indicates a memory location which corresponds to part way though a cache line. In this example, when the next write to the buffer takes place, locations not only up to the end of the current cache line are written with a predetermined value, but also further locations up to the end of the current memory page.

Figure 7A:
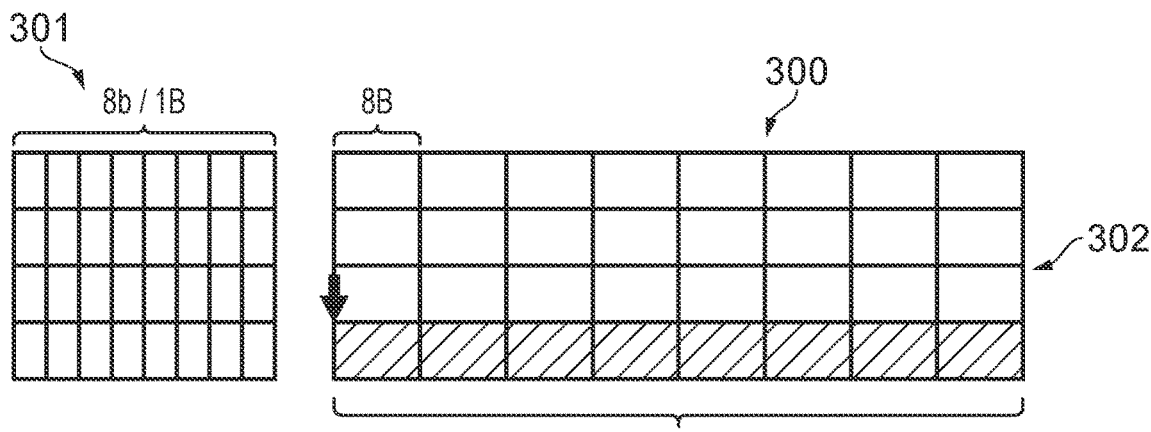
Figure 7B:
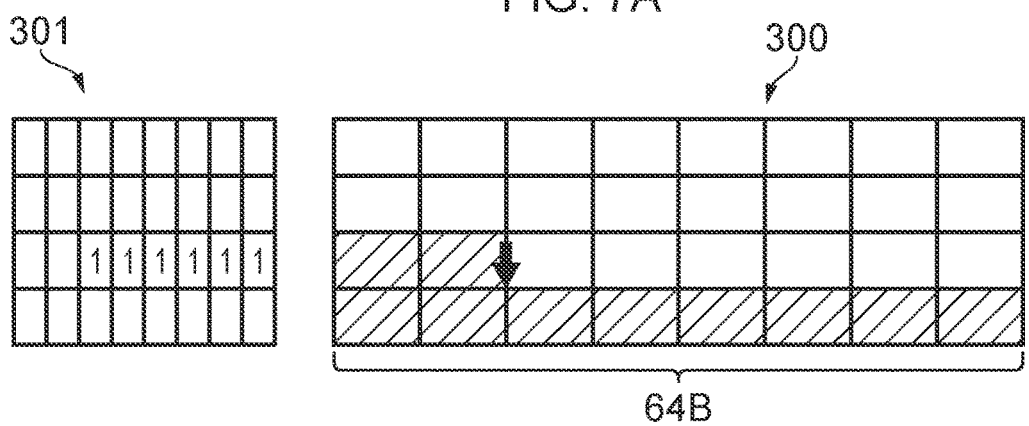
Figure 7C:
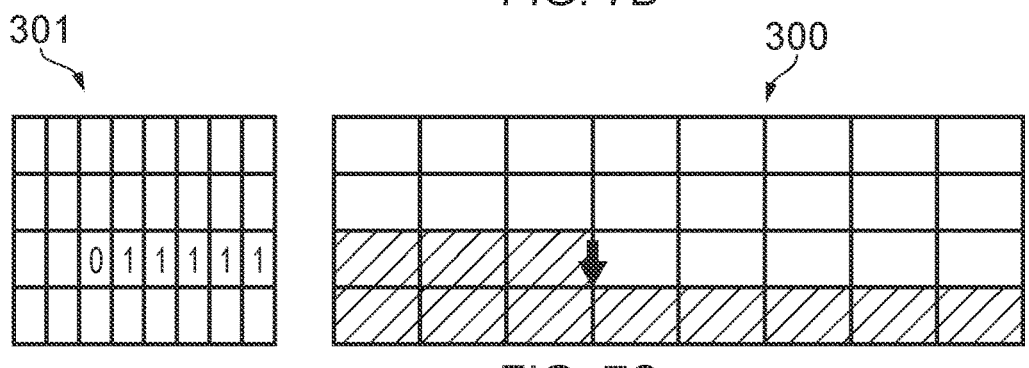
Figure 7D:
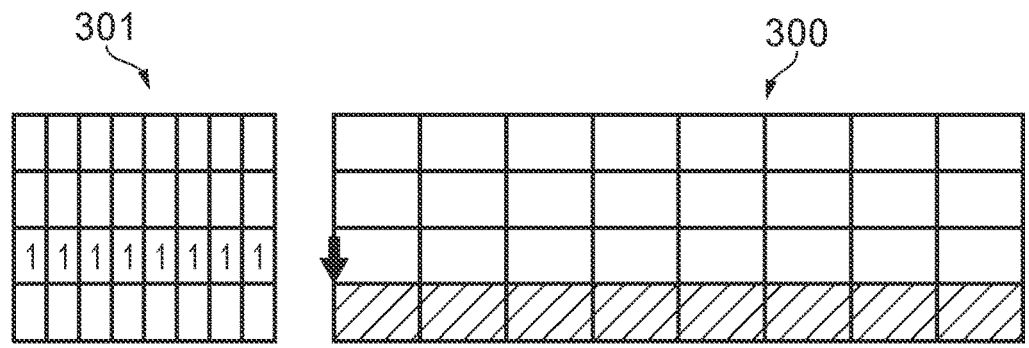

FIGS. 7A-D illustrate the present techniques when pushing a new data item into a buffer and when popping entries from a buffer in accordance with some disclosed examples. A set of 4 cache lines of data is shown for a cache 300 for which a corresponding associated storage 301 is provided, whereby the associated storage 301 provides an 8-bit value corresponding to each cache line, such that one bit of each 8-bit value corresponds to each 8 B data item of each 64 B cache line. These sizes of associated storage, data item size, and cache line size are merely exemplary. The processing element makes use of the 8-bit value associated with each 64 B cache line in order to track nominal writing of a predetermined value to the corresponding cache line locations. From the initial configuration shown in FIG. 7A, in which the cache line 302 is empty (or at least invalid and available for allocation) and where the write pointer indicates the first data item location of the cache line 302, a push results in the situation shown in FIG. 7B, wherein two 8 B data items have been written and correspondingly the write pointer has been moved two positions to the right. In addition, in the corresponding value of the additional storage 301, the six right-hand002Dmost bits have been set, marking the remainder of the cache line as "empty". Whilst this could later be followed up by explicitly writing a predetermined value to the corresponding cache line location and indeed thus the corresponding memory locations, the use of the notation in the additional storage 301 can avoid this as FIGS. 7C and 7D show. Following the status of FIG. 7B, a further push occurs adding a single further 8 B data item, and hence the corresponding bit for this data item is cleared in the additional storage 301. Then at the next step the three data items pushed onto the buffer by the steps of FIGS. 7B and 7C are popped, such that the cache line 302 is then entirely cleared of valid buffer data. These pops cause the corresponding entries in the additional storage 301 to be marked indicating "empty" such that the entire cache line is marked as "empty". Thus null status of the cache line thus means that need not be written back to memory and a corresponding memory transaction can thus be avoided.

FIG. 8 illustrates a region of memory in which a circular buffer is implemented in accordance with the present techniques. The circular buffer is defined to occupy a set of consecutive memory locations between a base pointer and a limit pointer. It will be appreciated that the extend of a circular buffer could be variously defined (e.g. as a base pointer and associated size) and that this is not of significance to the present disclosure. A write pointer indicates the address of a current write position for new data being written to the circular buffer, and the direction of increasing memory addresses shown is also the write progression direction. Accordingly, when the write pointer reaches the limit pointer its next increment causes it to revert to the position of the base pointer and the oldest data there is overwritten by the newest data now being written. Hence in the context of the present techniques, wherein one or more data value locations beyond the write pointer are written (or at least flagged to be written) with a predetermined value, when the memory buffer is a circular buffer such as that shown in FIG. 8, the further locations to be written with the predetermined value may at least partially be wrapped-around. A maximum size of the number of further locations that may be so written with the predetermined value (in order to gain the benefit of more efficient cache usage) may then be imposed to ensure that only an acceptable portion of older circular buffer data is potentially wiped out by the technique.

FIG. 9 schematically illustrates a data processing apparatus in accordance with some disclosed examples. The processing element 401 is provided with a local cache 402 by which it is coupled to an interconnect 403. The interconnect 403 provides the processing element for one with access to memory 404 in which the processing element maintains a memory buffer 405 in accordance with any variation of the techniques described herein. The processing element 401 further comprises a write pointer register 406 which indicates the current write position within the memory buffer 405. Additionally, the processing element 401 comprises a write control register 407. A bit held in the write control register 407 controls whether the technique of writing beyond the write pointer as described herein is currently enabled. This makes the technique software controllable. The memory 404 is also shown to hold an access control table 408, which may for example be in the format of a translation table, defining access controls and other memory region specific characteristics. Alternatively or in addition to the write control register 407, a control field may be provided in the access control table 408, defining whether the technique of writing beyond the write pointer as described herein is enabled for a given memory region.

FIG. 10 is a flow diagram showing a sequence of steps which are taken in accordance with the method of some disclosed examples. The sequence of steps begins at step 500, according to which a new data item is to be written to the memory buffer. This new data item is cached at step 501 in the local cache of the processing element seeking to write this data item to the memory buffer (in dependence on the memory location indicated by the write pointer) and at step 502 the write pointer is updated. At step 503 it is determined if the write pointer aligns with a predefined boundary location (for example a cache line extremity or a memory page, depending on how the technique is being implemented). If it does not, then the flow proceeds via step 504 where memory locations between the write pointer location and the next boundary location (in the write progression direction for the memory buffer) are signalled to be written with a predetermined value. As explained above with reference to earlier figures, this signalling may comprise explicit writing of the predetermined value, or alternatively may comprise a separate indication being stored in association with the corresponding locations that they have been allocated the predetermined value. If at step 503 it is determined that the write pointer does align with the predefined boundary location, then the flow proceeds directly to step 505. At step 505 it is determined if one or more cache lines are to be written back to memory yet. If this is the case, then at step 506 the cache line(s), including the predetermined value(s) are written out the memory buffer. Otherwise further data processing continues as represented by step 507. In view of the description of the proceeding figures, it will be appreciated that this further processing of step 507 may involve further locations being signalled to be written with the predetermined value and/or an entire cache line being filled with that predetermined value.

In brief overall summary, data processing apparatuses and methods of data processing are disclosed wherein a processing element maintains a buffer in the memory in support of the data processing it performs. A write pointer indicates a current write location in the buffer. A cache holds copies of the data which are subject to the data processing operations and allocations into the cache from the memory and write-backs from the cache to the memory are performed in cache line units of data. When the processing element performs a data write to the buffer at a location determined by the write pointer, the processor updates the write pointer in an update direction corresponding to a progression direction of data writes in the buffer, and further locations in the progression direction in the buffer between the location indicated by the write pointer and a boundary location are signalled to be written with a predetermined value.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

Some example of the present disclosure are set out in the following numbered Clauses:

A data processing apparatus comprising:
  a processing element configured to perform data processing operations;
  a memory configured to store data which is subject to the data processing operations, wherein as part of the data processing operations the processing circuitry is configured to maintain a buffer in the memory;
  a register configured to hold a write pointer indicative of a current write location in the buffer; and
  a cache configured to cache copies of the data which are subject to the data processing operations by the processing circuitry, wherein the copies of the data are stored in cache lines, wherein the cache is configured to perform allocation into the cache from the memory and write-back from the cache to the memory in cache line units of data,
  and wherein the processing element is configured such that, when the processing element performs a data write to the buffer at a location determined by the write pointer, the processor updates the write pointer in an update direction corresponding to a progression direction of data writes in the buffer, and further locations in the progression direction in the buffer between the location indicated by the write pointer and a boundary location are signalled to be written with a predetermined value.

Clause 2. The data processing apparatus as defined in Clause 1, further comprising a storage element associated with the cache and configured to store indicator values associated with each cache line of the cache,
wherein respective bits of an indicator value indicate which data items of a cache line are signalled to have the predetermined value.

Clause 3. The data processing apparatus as defined in Clause 2, wherein signalling that the further locations in the progression direction in the buffer between the location indicated by the write pointer and the boundary location are to be written with the predetermined value comprises setting bits of at least one indicator value associated with at least one cache line associated with the further locations.

Clause 4. The data processing apparatus as defined in any of Clauses 1-3, wherein the processing circuitry is configured to maintain the buffer in the memory in a last-in-first-out manner, wherein a pushed data item entry added to the buffer is written at the location determined by the write pointer, wherein removal of a popped data item from the buffer comprises popping the popped data item from a pop location adjacent to the location determined by the write pointer in an opposite direction to the progression direction, and wherein the pop location is signalled to be written with the predetermined value.

Clause 5. The data processing apparatus as defined in Clause 4, when dependent on Clause 3, wherein the removal of the popped data item from the buffer comprises un-setting the bits of the at least one indicator value associated with the at least one cache line associated with the further locations and un-setting a bit of an indicator value associated with the pop location.

Clause 6. The data processing apparatus as defined in Clause 1-5, wherein the boundary location corresponds to a cache line extremity.

Clause 7. The data processing apparatus as defined in Clause 6, wherein the cache line extremity corresponds to a cache line end.

Clause 8. The data processing apparatus as defined in Clause 6, wherein the cache line extremity corresponds to a cache line start.

Clause 9. The data processing apparatus as defined in any of Clauses 1-8, wherein the processing element is configured to update the write pointer in an ascending direction corresponding to an ascending progression direction of data writes in the buffer.

Clause 10. The data processing apparatus as defined in any of Clauses 1-8, wherein the processing element is configured to update the write pointer in a descending direction corresponding to a descending progression direction of data writes in the buffer.

Clause 11. The data processing apparatus as defined in any of Clauses 1-10, wherein the data processing operations performed by the processing element comprise data sampling and wherein the buffer in the memory is a sample data buffer.

Clause 12. The data processing apparatus as defined in any of Clauses 1-10, wherein the data processing operations performed by the processing element comprise generation of program-flow trace data and wherein the buffer in the memory is a trace buffer.

Clause 13. The data processing apparatus as defined in any of Clauses 1-10, wherein the data processing operations performed by the processing element comprise execution of branch instructions and return instructions, and wherein the buffer in the memory is a hardware shadow stack.

Clause 14. The data processing apparatus as defined in any of Clauses 1-10, wherein the buffer in the memory is a software stack, wherein the data processing operations performed by the processing element comprise pushing data onto the software stack and popping data from the software stack.

Clause 15. The data processing apparatus as defined in any of Clauses 1-14, wherein the boundary location is the extremity of the cache line in which the data value at the location is stored temporarily in the cache.

Clause 16. The data processing apparatus as defined in any of Clauses 1-14, wherein the boundary location is the extremity of a further cache line which is not the cache line in which the data value at the location is stored temporarily in the cache,
and wherein a contiguous block of data between the location determined by the write pointer at which the processing element performs the data write to the buffer and the extremity of the further cache line is caused to be written with the predetermined value.

Clause 17. The data processing apparatus as defined in Clause 16, wherein the boundary location corresponds to a memory page boundary.

Clause 18. The data processing apparatus as defined in Clause 16, wherein the processing circuitry is configured to maintain the buffer in a wrap-around manner, wherein the buffer is arranged to cover a predetermined range of memory locations and when a write has reached an extremity of the predetermined range of memory locations in the progression direction of data writes in the buffer the processing circuitry performs a next data write to the buffer at an opposite extremity of the predetermined range of memory locations, and wherein the contiguous block of data has a predetermined maximum size.

Clause 19. The data processing apparatus as defined in any preceding Clause, further comprising at least one control register configured to hold a control value, wherein the processing element is configured such that signalling the predetermined value to be written to the further locations in the procession direction in the buffer between the location indicated by the write pointer and the boundary location is further dependent on the control value.

Clause 20. The data processing apparatus as defined in any preceding Clause, wherein access to data stored in the memory is dependent on configuration data stored in at least one access control table stored in the memory,
wherein the configuration data defines for each location in the memory characteristics of the access,
and wherein the processing element is configured such that signalling the predetermined value to be written to the further locations in the progression direction in the buffer between the location indicated by the write pointer and the boundary location is further dependent on the configuration data corresponding to the location indicated by the write pointer.

Clause 21. The data processing apparatus as defined in any preceding Clause, wherein the predetermined value which is signalled to be written between the location indicated by the write pointer and the boundary location has a null meaning with respect to the data processing operations performed.

Clause 22. The data processing apparatus as defined in any preceding Clause, wherein the memory is at least partly shared with a further processing element having a further cache, and the cache and the further cache cooperatively participate in a cache coherence protocol with respect to content of the cache and the further cache.

Clause 23. A method of data processing comprising:
performing data processing operations;
storing data which is subject to the data processing operations in a memory, wherein the data processing operations comprise maintaining a buffer in the memory;
holding in a register a write pointer indicative of a current write location in the buffer; and
caching in a cache copies of the data which is subject to the data processing operations, wherein the copies of the data are stored in cache lines, and wherein allocation into the cache from the memory and write-back from the cache to the memory are performed in cache line units of data;
and, when a data write to the buffer is performed at a location determined by the write pointer, updating the write pointer in an update direction corresponding to a progression direction of data writes in the buffer, and signalling further locations in the procession direction in the buffer between the location indicated by the write pointer and a boundary location to be written with a predetermined value.

What is claimed is:

1. A data processing apparatus comprising:
processing circuitry configured to perform data processing operations;
a memory configured to store data which is subject to the data processing operations, wherein as part of the data processing operations, the processing circuitry is configured to maintain a buffer in the memory;
a register configured to hold a write pointer indicative of a current write location in the buffer; and
a cache configured to cache copies of the data which are subject to the data processing operations by the processing circuitry, wherein the copies of the data are stored in cache lines, wherein the cache is configured to perform allocation into the cache from the memory and write-back from the cache to the memory in cache line units of data, and
wherein the processing circuitry is configured, when the processing circuitry performs a data write to the buffer at a location determined by the write pointer, to update the write pointer in an update direction corresponding to a progression direction of data writes in the buffer, and further locations in the progression direction in the buffer between the location indicated by the write pointer and a boundary location are signalled to be written with a predetermined value.

2. The data processing apparatus as claimed in claim 1, further comprising a storage associated with the cache and configured to store indicator values associated with each cache line of the cache, wherein respective bits of an indicator value indicate which data items of a cache line are signalled to have the predetermined value.

3. The data processing apparatus as claimed in claim 2, wherein signalling that the further locations in the progression direction in the buffer between the location indicated by the write pointer and the boundary location are to be written with the predetermined value comprises setting bits of at least one indicator value associated with at least one cache line associated with the further locations.

4. The data processing apparatus as claimed in claim 1, wherein the processing circuitry is configured to maintain the buffer in the memory in a last-in-first-out manner, wherein a pushed data item entry added to the buffer is written at the location determined by the write pointer, wherein removal of a popped data item from the buffer comprises popping the popped data item from a pop location adjacent to the location determined by the write pointer in an opposite direction to the progression direction, and wherein the pop location is signalled to be written with the predetermined value.

5. The data processing apparatus as claimed in claim 4, wherein the removal of the popped data item from the buffer comprises un-setting the bits of the at least one indicator value associated with the at least one cache line associated with the further locations and un-setting a bit of an indicator value associated with the pop location.

6. The data processing apparatus as claimed in claim 1, wherein the boundary location corresponds to a cache line extremity.

7. The data processing apparatus as claimed in claim 6, wherein the cache line extremity corresponds to one of: a cache line end; or a cache line start.

8. The data processing apparatus as claimed in claim 1, wherein the processing circuitry is configured to update the write pointer in an ascending direction corresponding to an ascending progression direction of data writes in the buffer.

9. The data processing apparatus as claimed in claim 1, wherein the processing circuitry is configured to update the write pointer in a descending direction corresponding to a descending progression direction of data writes in the buffer.

10. The data processing apparatus as claimed in claim 1, wherein the data processing operations performed by the processing circuitry comprise data sampling and wherein the buffer in the memory is a sample data buffer.

11. The data processing apparatus as claimed in claim 1, wherein the data processing operations performed by the processing circuitry comprise generation of program-flow trace data and wherein the buffer in the memory is a trace buffer.

12. The data processing apparatus as claimed in claim 1, wherein the data processing operations performed by the processing circuitry comprise execution of branch instructions and return instructions, and wherein the buffer in the memory is a hardware shadow stack.

13. The data processing apparatus as claimed in claim 1, wherein the buffer in the memory is a software stack, wherein the data processing operations performed by the processing circuitry comprise pushing data onto the software stack and popping data from the software stack.

14. The data processing apparatus as claimed in claim 1, wherein the boundary location is the extremity of the cache line in which the data value at the location is stored temporarily in the cache.

15. The data processing apparatus as claimed in claim 1, wherein the boundary location is the extremity of a further cache line which is not the cache line in which the data value at the location is stored temporarily in the cache, and wherein a contiguous block of data between the location determined by the write pointer at which the processing circuitry performs the data write to the buffer and the extremity of the further cache line is caused to be written with the predetermined value.

16. The data processing apparatus as claimed in claim 15, wherein the boundary location corresponds to a memory page boundary.

17. The data processing apparatus as claimed in claim 16, wherein the processing circuitry is configured to maintain the buffer in a wrap-around manner, wherein the buffer is arranged to cover a predetermined range of memory locations and when a write has reached an extremity of the predetermined range of memory locations in the progression direction of data writes in the buffer the processing circuitry performs a next data write to the buffer at an opposite extremity of the predetermined range of memory locations, and wherein the contiguous block of data has a predetermined maximum size.

18. The data processing apparatus as claimed in claim 1, further comprising at least one control register configured to hold a control value, wherein the processing circuitry is configured to signal the predetermined value to be written to the further locations in the procession direction in the buffer between the location indicated by the write pointer and the boundary location is further dependent on the control value.

19. The data processing apparatus as claimed in claim 1, wherein access to data stored in the memory is dependent on configuration data stored in at least one access control table stored in the memory, wherein the configuration data defines for each location in the memory characteristics of the access, and wherein the processing circuitry is configured to signal the predetermined value to be written to the further locations in the progression direction in the buffer between the location indicated by the write pointer and the boundary location is further dependent on the configuration data corresponding to the location indicated by the write pointer.

20. A method of data processing comprising:

performing data processing operations;

storing data which is subject to the data processing operations in a memory, wherein the data processing operations comprise maintaining a buffer in the memory;

holding in a register a write pointer indicative of a current write location in the buffer; and caching in a cache copies of the data which is subject to the data processing operations, wherein the copies of the data are stored in cache lines, and wherein allocation into the cache from the memory and write-back from the cache to the memory are performed in cache line units of data;

and, when a data write to the buffer is performed at a location determined by the write pointer, updating the write pointer in an update direction corresponding to a progression direction of data writes in the buffer, and signalling further locations in the procession direction in the buffer between the location indicated by the write pointer and a boundary location to be written with a predetermined value.

* * * * *